(12) United States Patent
Wang

(10) Patent No.: US 9,155,026 B2
(45) Date of Patent: Oct. 6, 2015

(54) SYSTEMS FOR FACILITATING WIRELESS COMMUNICATION AND RELATED METHODS

(75) Inventor: Huaiyuan Wang, Cary, NC (US)

(73) Assignee: HTC CORPORATION, Taoyuan (TW)

( * ) Notice: Subject to any disclaimer, the term of this patent is extended or adjusted under 35 U.S.C. 154(b) by 128 days.

(21) Appl. No.: 13/372,701

(22) Filed: Feb. 14, 2012

(65) Prior Publication Data

US 2013/0178160 A1     Jul. 11, 2013

Related U.S. Application Data

(60) Provisional application No. 61/584,926, filed on Jan. 10, 2012, provisional application No. 61/592,556, filed on Jan. 30, 2012.

(51) Int. Cl.
| | |
|---|---|
| *H04B 7/00* | (2006.01) |
| *H04W 48/10* | (2009.01) |
| *H04W 88/06* | (2009.01) |
| *H04W 84/18* | (2009.01) |
| *H04W 4/00* | (2009.01) |

(52) U.S. Cl.
CPC .............. *H04W 48/10* (2013.01); *H04W 4/008* (2013.01); *H04W 84/18* (2013.01); *H04W 88/06* (2013.01)

(58) Field of Classification Search
CPC ..................................................... H04W 84/18
USPC ............................ 455/3.01, 41.1, 41.2, 552.1
See application file for complete search history.

(56) References Cited

U.S. PATENT DOCUMENTS

| | | | |
|---|---|---|---|
| 8,509,211 B2* | 8/2013 | Trotter et al. .................. | 370/349 |
| 2009/0047991 A1* | 2/2009 | Elg ............................ | 455/552.1 |
| 2009/0234728 A1 | 9/2009 | Willuns et al. | |
| 2010/0141400 A1 | 6/2010 | Radulescu et al. | |
| 2011/0014868 A1 | 1/2011 | Yun et al. | |

FOREIGN PATENT DOCUMENTS

EP         1 895 713 A1       3/2008

OTHER PUBLICATIONS

European search report issued Mar. 4, 2013.
European Office Action issued Mar. 4, 2013.
European search report issued May 23, 2012.
European Examination Report dated Dec. 18, 2014.

* cited by examiner

*Primary Examiner* — Tuan H Nguyen
(74) *Attorney, Agent, or Firm* — McClure, Qualey & Rodack, LLP

(57) ABSTRACT

Systems for facilitating wireless communication and related methods are provided. In this regard, a representative system includes: an electronic device operative to communicate using Bluetooth and Wi-Fi, the device having a Wi-Fi monitoring system operative to: monitor Bluetooth Low Energy (BLE) advertising channels; receive information corresponding to a Wi-Fi-capable device via BLE Advertisement packets communicated on at least one of the BLE advertising channels; and establish communication with the Wi-Fi-capable device using the information provided by the BLE Advertisement packets.

18 Claims, 5 Drawing Sheets

SYSTEMS FOR FACILITATING WIRELESS COMMUNICATION AND RELATED METHODS

CROSS REFERENCE TO RELATED APPLICATION

This application is a utility application that claims priority to U.S. Provisional Patent Application entitled, "Bluetooth Low Energy Assisted Low Power Wi-Fi Detection", having Ser. No. 61/584,926, filed Jan. 10, 2012, and U.S. Provisional Patent Application entitled, "Systems for Facilitating Wireless Communication and Related Methods", having Ser. No. 61/592,556, filed Jan. 30, 2012, both of which are entirely incorporated herein by reference.

TECHNICAL FIELD

The present disclosure generally relates to Wi-Fi communication.

BACKGROUND

An electronic device, such as mobile phone or tablet computer, may be configured to scan for a Wi-Fi-capable device, such as a Wi-Fi access point (AP) or a peer device (e.g., Wi-Fi speakers, Wi-Fi dongles, Wi-Fi printers, etc.) with Wi-Fi capability. Scanning for a Wi-Fi-capable device may be performed by the electronic device in a passive manner. For instance, in the U.S., there are currently 12 and 23 operating channels in the 2.4 and 5 GHz bands, respectively. For each scan cycle, the device typically scans for all 35 channels and monitors for beacon transmission on each of the channels for up to the duration of the beacon interval, which is typically 100 ms. Assuming Wi-Fi passive scanning is performed every 5 minutes, this translates to a 3500 ms passive scanning time every 5 minutes, which corresponds to a duty cycle of 1.167%. Assuming 70 mA power consumption for the Wi-Fi receiver of the device, this corresponds to power consumption of over 0.8 mAh for each scan cycle.

SUMMARY

Systems for facilitating wireless communication and related methods are provided. Briefly described, one embodiment, among others, is a system comprising: an electronic device operative to communicate using Bluetooth and Wi-Fi, the device having a Wi-Fi monitoring system operative to: monitor Bluetooth Low Energy (BLE) advertising channels; receive information corresponding to a Wi-Fi-capable device via BLE Advertisement packets communicated on at least one of the BLE advertising channels; and establish communication with the Wi-Fi-capable device using the information provided by the BLE Advertisement packets.

Another embodiment is a method for method for facilitating wireless communication comprising: monitoring Bluetooth Low Energy (BLE) advertising channels with an electronic device; receiving, at the electronic device, information corresponding to a Wi-Fi-capable device via BLE Advertisement packets associated with at least one of the BLE advertising channels; and establishing communication between the electronic device and the Wi-Fi-capable device via appropriate Wi-Fi protocol using the information provided by the BLE Advertisement packets.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
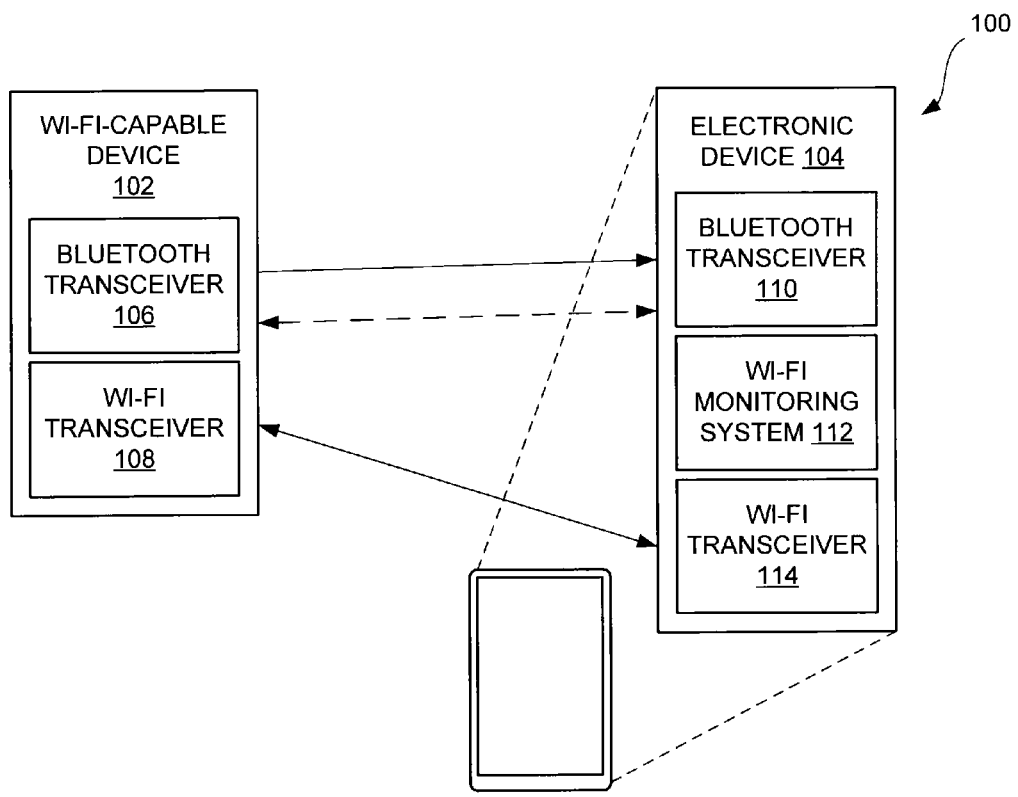
FIG. 1 is a schematic diagram of an example embodiment of a system for facilitating wireless communication.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, systems for facilitating wireless communication and related methods are provided, some embodiments of which involve the use of Bluetooth transmitters associated with Wi-Fi-capable devices (i.e., devices capable of Wi-Fi communication). By way of example, in some embodiments, a Bluetooth transmitter may be collocated (e.g., provided within a common housing) with a Wi-Fi capable device, such as a Wi-Fi access point (AP) or Wi-Fi peer device. In an example embodiment, a Bluetooth low energy (BLE) transmitter transmits Wi-Fi information associated with the Wi-Fi-capable device. An electronic device monitors for such information using a BLE receiver and, responsive to detecting the Wi-Fi information, may begin authentication and association or peer-to-peer connection procedures for facilitating communication with the Wi-Fi-capable device. Notably, use of the BLE receiver for monitoring for Wi-Fi information uses less energy than may be required for such scanning using standard Wi-Fi scanning procedures.

FIG. 1 is a schematic diagram of an example embodiment of a system for facilitating wireless communication. As shown in FIG. 1, system 100 includes a Wi-Fi capable device 102 and an electronic device 104, which may be configured as a smartphone or tablet computer, among others, for communicating with the Wi-Fi-capable device. The Wi-Fi-capable device incorporates a Bluetooth transceiver 106 and a Wi-Fi transceiver 108. It should be noted that the communication components in the embodiment of FIG. 1 (or any other disclosed embodiments) should be understood to alternatively refer to components that are only able to perform the functionality described. Thus, in this embodiment, reference to a transceiver, for example, may also be understood to refer to a transmitter when functionality only involving transmitting of signals is required. It should also be noted that the box surrounding the transceivers 106 and 108, although intended to indicate a physical structure such as a housing in FIG. 1, may merely indicate proximity of the enclosed components in other embodiments.

Electronic device 104 incorporates a Bluetooth transceiver 110 (e.g., a Bluetooth Low Energy (BLE) receiver), a Wi-Fi monitoring system 112 and a Wi-Fi transceiver 114. In operation, Bluetooth transceiver 110 scans (e.g., passively scans) for information in the form of Bluetooth advertisement packets (e.g., ADV_IND or ADV_NONCONN_IND packets) that contain Wi-Fi information, which is specific to the Wi-Fi-capable device. The transmission of a BLE advertisement packet is represented by the single arrowed line directed toward the electronic device. Notably, the Wi-Fi information carried by the BLE advertisement packets may include, but is not limited to, SSID, BSSID, operating band, channel number, and other predefined information elements for the Wi-Fi-capable device.

Responsive to detection of Wi-Fi information, Wi-Fi monitoring system 112 may optionally instruct the Bluetooth transceiver 110 to establish a data connection with Bluetooth transceiver 106 (represented by the double arrowed line) to further exchange information with the Wi-Fi-capable device 102. Upon receiving required information, Wi-Fi monitoring system 112 then enables Wi-Fi transceiver 114 to initiate authentication and association or peer-to-peer connection procedures with the Wi-Fi-capable device (represented by the double arrowed line) in order to establish communication between the electronic device and the Wi-Fi-capable device using appropriate Wi-Fi protocol.

While operating in this manner, energy typically consumed by performing Wi-Fi-based scans may be avoided, resulting in a corresponding reduction in energy usage of the electronic device. By way of example, if electronic device 104 sniffs for BLE packets for 11.25 ms in every 1.28 s, the duty cycle of such scanning is 0.88%. Based on a Bluetooth receiver power consumption of approximately 18 mA, only 0.158 mAh of power is consumed during each sniffing cycle (compared to 70 mA power consumption for a Wi-Fi receiver and power consumption of over 0.8 mAh for each scan cycle as described previously).

Figure 2:
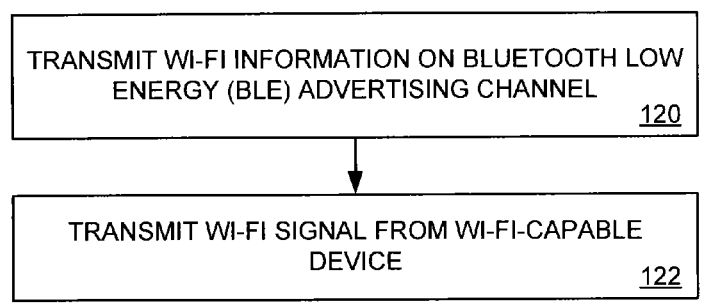
FIG. 2 is a flowchart depicting an example embodiment of a method for facilitating wireless communication.

FIG. 2 is a flowchart depicting an example embodiment of a method for facilitating wireless communication, which may be performed by Wi-Fi-capable device 102 of FIG. 1, for example. As shown in FIG. 2, the method involves transmitting BLE Advertisements containing Wi-Fi information (and optionally predefined proprietary information elements) on a BLE advertising channel (block 120). In block 122, a Wi-Fi signal (which exhibits characteristics referenced in the Wi-Fi information, is transmitted from the Wi-Fi-capable device.

Figure 3:
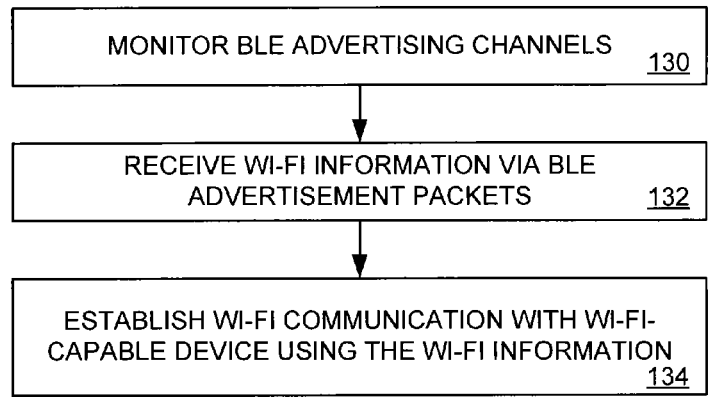
FIG. 3 is a flowchart depicting another example embodiment of a method for facilitating wireless communication.

FIG. 3 is a flowchart depicting another example embodiment of a method for facilitating wireless communication, which may be performed by an electronic device. As shown in FIG. 3, the method involves monitoring BLE advertising channels for BLE Advertisement packets carrying Wi-Fi information (block 130). In block 132, Wi-Fi information is received. Then, as depicted in block 134, Wi-Fi communication is established with a Wi-Fi-capable device using the Wi-Fi information that was received via the BLE Advertisement packets. It should be noted that, in some embodiments, an optional function may be involved in which a BLE data connection is established to further exchange Wi-Fi-capable device information.

Figure 4:
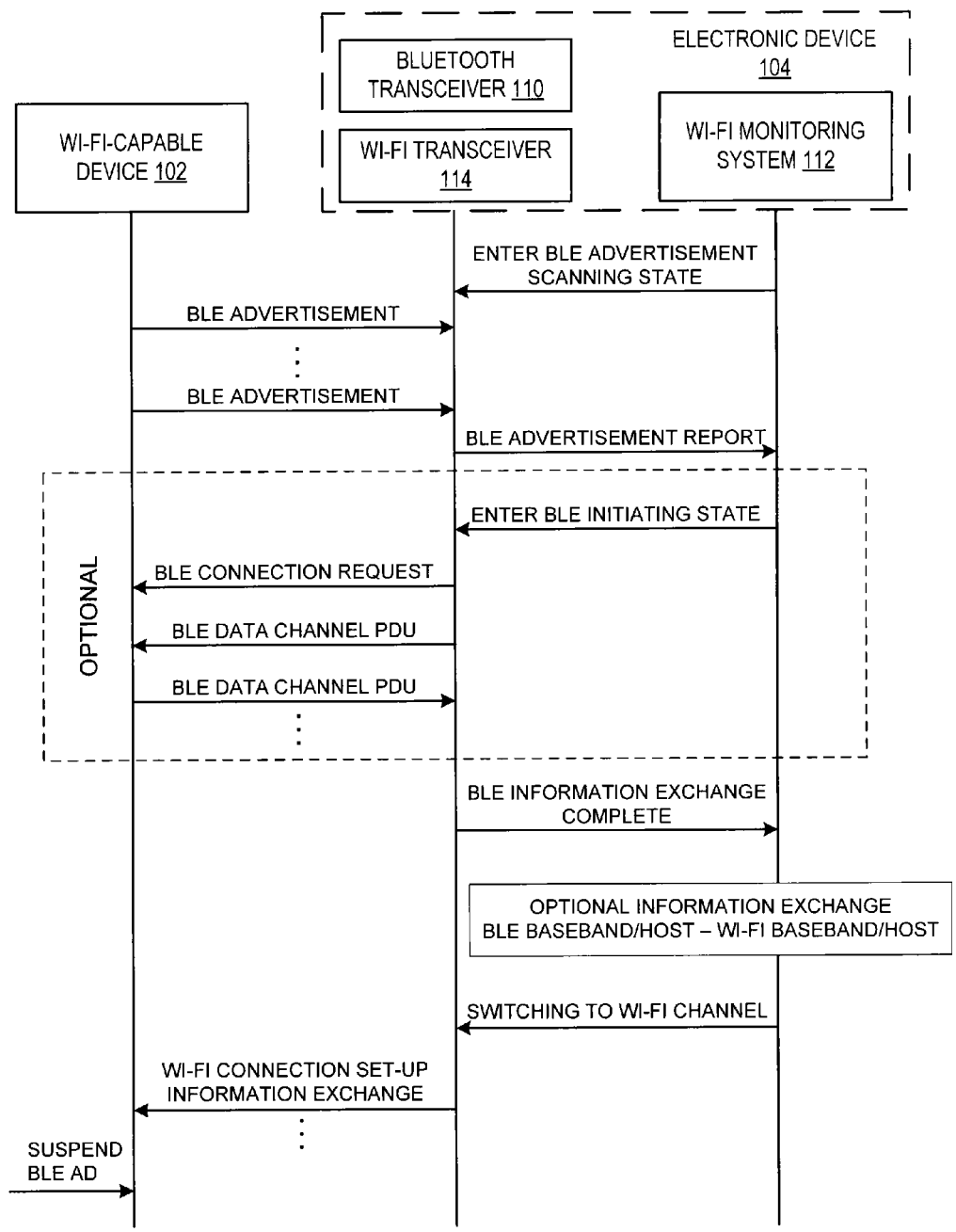
FIG. 4 is a communication flow diagram depicting functionality that may be performed by the embodiment of FIG. 1.

FIG. 4 is a communication flow diagram depicting functionality that may be performed by the embodiment of FIG. 1. As shown in FIG. 4, electronic device 104 enters a BLE Advertisement scanning state. Meanwhile, Wi-Fi-capable device 102 transmits BLE Advertisement packets, which are detected by Bluetooth transceiver 110. Responsive to the detection, a BLE Advertisement report is communicated to Wi-Fi monitoring system 112, after which an optional state is entered.

In the optional state, the Wi-Fi monitoring system enters a BLE Initiating State, in which the Bluetooth transceiver transmits a connection request to the Wi-Fi-capable device. Thereafter, an exchange of BLE data channel PDU is conducted. This optional state may end after the completion of the exchange of BLE information. It should also be noted that an optional information exchange may take place that involves an exchange of information corresponding to BLE baseband/host and Wi-Fi baseband/host.

After appropriate information exchanges are completed, the Wi-Fi monitoring system switches to Wi-Fi channel via the Wi-Fi transceiver 114 for communicating with the Wi-Fi-capable device. This is accomplished through a Wi-Fi connection set-up information exchange. Thereafter, the Wi-Fi-capable device may suspend BLE Advertisement, such as until the Wi-Fi connection is terminated, for example.

Figure 5:
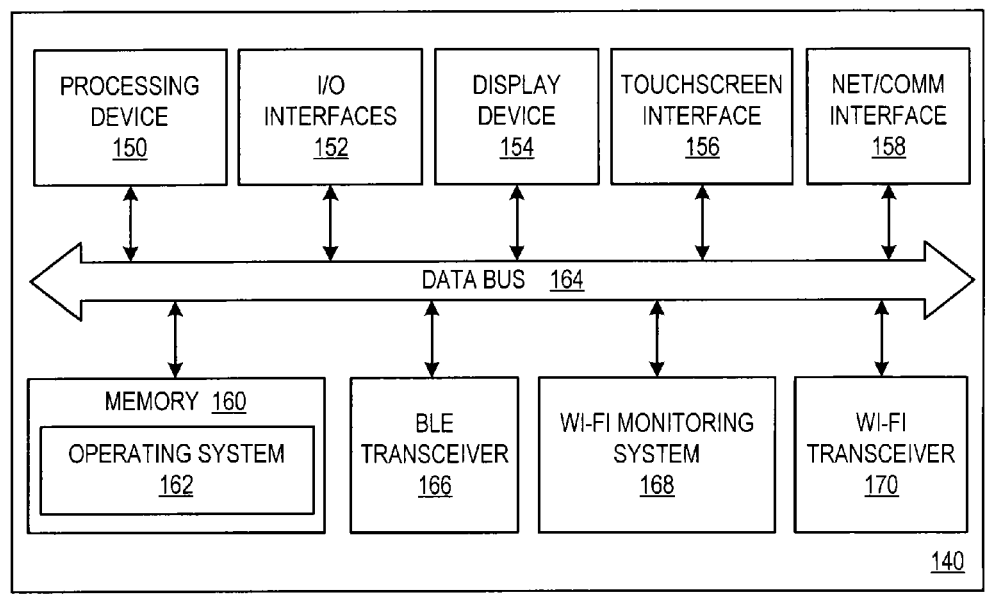
FIG. 5 is a schematic diagram of an example embodiment of an electronic device.

FIG. 5 is a schematic diagram of an example embodiment of an electronic device that may form a portion of a system for facilitating wireless communication. As shown in FIG. 5, device 140 (which in this embodiment is configured as a smartphone) includes a processing device (processor) 150, input/output interfaces 152, a display device 154, a touch-screen interface 156, a network/communication interface 158, a memory 160, and an operating system 162, with each communicating across a local data bus 164. Additionally, the system incorporates a Bluetooth Low Energy transceiver 166, a Wi-Fi monitoring system 168 and a Wi-Fi transceiver 170.

The processing device 150 may include a custom made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 160 may include any one of a combination of volatile memory elements (e.g., random-access memory (RAM, such as DRAM, and SRAM, etc.)) and nonvolatile memory elements. The memory typically comprises native operating system 162, one or more native applications, emulation systems, or emulated applications for any of a variety of operating systems and/or emulated hardware platforms, emulated operating systems, etc. For example, the applications may include application specific software which may comprise some or all the components of the system. In accordance with such embodiments, the components are stored in memory and executed by the processing device. Note that although depicted as being resident separate from memory 160, Wi-Fi monitoring system 168 may be stored in memory.

The memory 160 may also be configured to exchange information between BLE transceiver 166, Wi-Fi monitoring system 168 and/or Wi-Fi transceiver 170.

Touchscreen interface 156 is configured to detect contact within the display area of the display 154 and provides such functionality as on-screen buttons, menus, keyboards, soft keys, etc. that allows users to navigate user interfaces by touch. Notably, navigating via the touchscreen interface may facilitate various functions associated with displayed content items such as searching and downloading.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

With further reference to FIG. 5, network/communication interface 158 comprises various components used to transmit and/or receive data over a networked environment. By way of example, such components may include a wireless communications interface. When such components are embodied as an application, the one or more components may be stored on a non-transitory computer-readable medium and executed by the processing device. Although capable of being depicted in association with the network/communication interface 158, BLE transceiver 166 and Wi-Fi transceiver 170 are depicted separately in this embodiment to facilitate description.

In particular, BLE transceiver 166 monitors for and receives information in the form of BLE Advertisement packets (e.g., ADV_IND or ADV_NONCONN_IND packets) that may contain Wi-Fi information. Such Wi-Fi information may include SSID, BSSID, operating band and channel number, as well as other proprietarily encoded information. Responsive to detection of Wi-Fi information, Wi-Fi monitoring system 168, which may optionally instruct Bluetooth transceiver 166 to establish a BLE data connection for further information exchange, enables Wi-Fi transceiver 170 to initiate authentication and association or peer-to-peer connection procedures with the Wi-Fi-capable device in order to establish communication between the electronic device and the Wi-Fi-capable device using appropriate Wi-Fi protocols.

Figure 6:
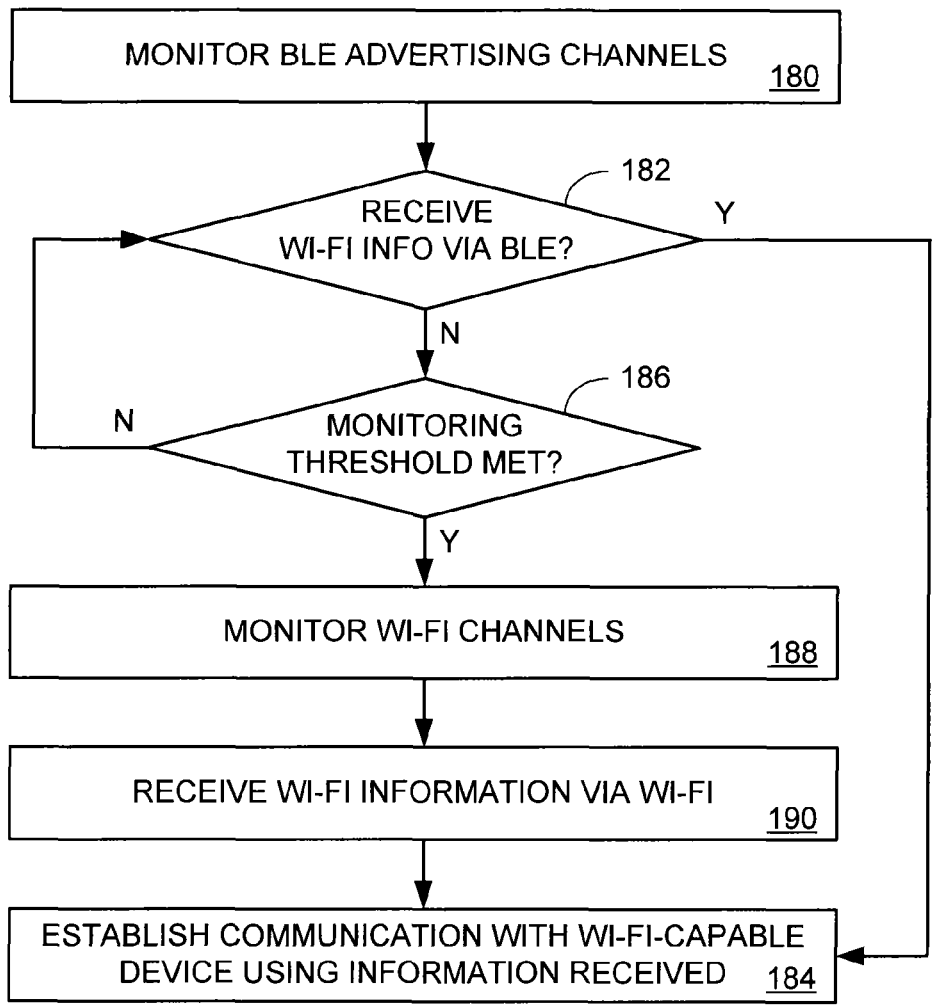
FIG. 6 is a flowchart depicting functionality that may be performed by an example embodiment of an electronic device, such as that depicted in FIG. 5.

FIG. 6 is a flowchart depicting functionality that may be performed by an example embodiment of an electronic device, such as device 140 of FIG. 5. As shown in FIG. 6, the functionality (or method) may be construed as beginning at block 180, in which BLE advertising channels are monitored. In block 182, a determination is made as to whether BLE Advertisement packets containing Wi-Fi information has been received. If such information has been received, the process may proceed to block 184, in which communication may be established with the Wi-Fi-capable device using the received information. If, however, the BLE Advertisement packets containing Wi-Fi information have not been received, the process may proceed to block 186.

In block 186, a determination is made as to whether a BLE monitoring threshold has been met. By way of example, if sniffing for BLE packets has occurred for a predetermined period of time, number of cycles, etc., the threshold may be determined to have been met, responsive to which the process may proceed to block 188. In block 188, Wi-Fi channels are monitored by invoking appropriate Wi-Fi scanning procedures. Notably, this may allow access to a Wi-Fi-capable device that is only capable of communicating via Wi-Fi protocols. However, if it determined in block 186 that a threshold has not been met, the process may return to block 182 and proceed as previously described.

After monitoring of Wi-Fi channels in block 188, the process may proceed to block 190, in which Wi-Fi information is received via appropriate Wi-Fi scanning. Thereafter, such as depicted in block 184 (and regardless of whether the Wi-Fi information was obtained via Wi-Fi or BLE), communication may be established with a Wi-Fi-capable device.

Figure 7:
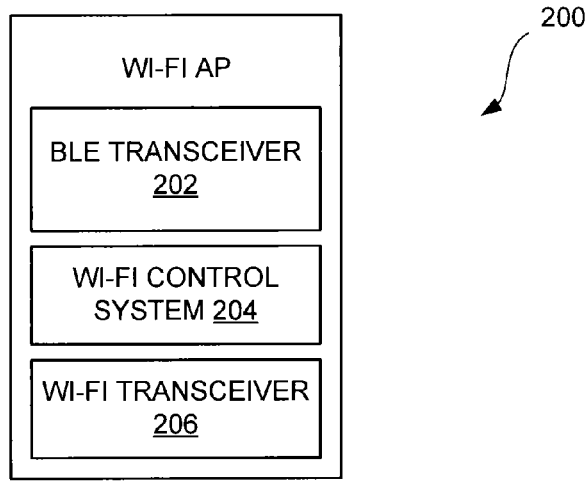
FIG. 7 is a schematic diagram of an example embodiment of a Wi-Fi access point.

FIG. 7 is a schematic diagram of an example embodiment of a Wi-Fi-capable device. As shown in FIG. 7, Wi-Fi-capable device (or system) 200 incorporates a BLE transceiver 202, a Wi-Fi control system 204 and a Wi-Fi transceiver 206. In operation, the BLE transceiver 202 selectively transmits packets (e.g., ADV_IND or ADV_NONCONN_IND packets, for example) that contain Wi-Fi information. Wi-Fi control system 204 communicates with BLE transceiver 202 and Wi-Fi transceiver 206 to coordinate the transmission of the Wi-Fi information so that it corresponds to the operating parameters of the Wi-Fi transceiver. This coordination permits devices to establish Wi-Fi communication with the Wi-Fi-capable device.

Figure 8:
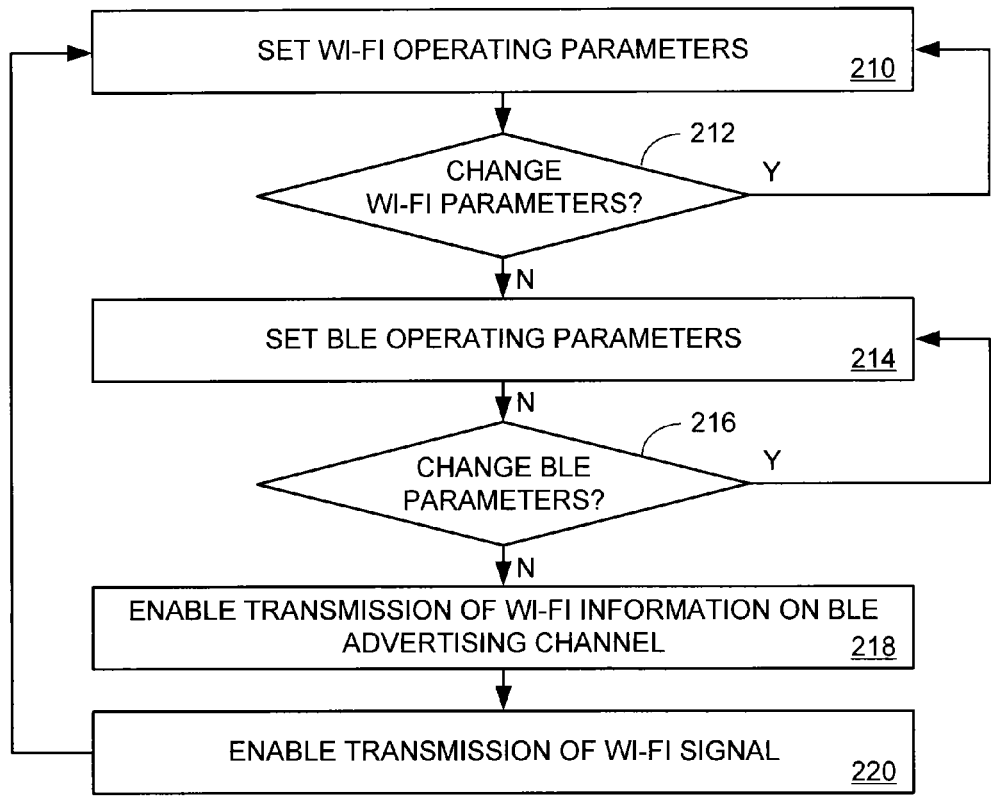
FIG. 8 is a flowchart depicting functionality that may be performed by an example embodiment of a Wi-Fi access point, such as that depicted in FIG. 7.

In this regard, FIG. 8 is a flowchart depicting functionality that may be performed by an example embodiment of a Wi-Fi-capable device, such as by the Wi-Fi control system 204 depicted in FIG. 6. As shown in FIG. 8, the functionality (or method) may be construed as beginning at block 210, in which Wi-Fi operating parameters are set. For example, one or more of SSID, BSSID and channel number, among others, may be set. In block 212, a determination is made as to whether any changes are to be made to the Wi-Fi operating parameters. If changes are to be made, the process may return to block 210. If, however, changes are not to be made, the process may proceed to block 214, in which operating parameters of a BLE transceiver are set. The process may then proceed to block 216.

In block 216, a determination is made as to whether any changes are to be made to the BLE operating parameters. If changes are to be made, the process may return to block 214. If, however, changes are not to be made, the process may proceed to block 218, in which transmission of BLE Advertising packets containing Wi-Fi information on a BLE advertising channel is enabled. Optionally, proprietary information may be encoded into the BLE Advertisement packets prior to transmission. Then, as depicted in block 220, transmission of a Wi-Fi signal exhibiting the selected Wi-Fi operating parameters is enabled.

If embodied in software, it should be noted that each block depicted in the flowchart of FIG. 8 (or any of the other flowcharts) represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. By way of example, the systems described may be implemented in hardware, software or combinations thereof. All such modifications and At least the following is claimed:

1. A system for facilitating wireless communication comprising:
   an electronic device operative to communicate using Bluetooth and Wi-Fi, the device having a Wi-Fi monitoring system operative to:
   monitor Bluetooth Low Energy (BLE) advertising channels;
   receive Wi-Fi information corresponding to a Wi-Fi-capable device via BLE Advertisement packets communicated on at least one of the BLE advertising channels, wherein the received Wi-Fi information corresponding to the Wi-Fi-capable device comprises operating band and channel of the Wi-Fi-capable device; and
   establish Wi-Fi communication with the Wi-Fi-capable device using the received Wi-Fi information provided by the BLE Advertisement packets.

2. The system of claim 1, wherein the Wi-Fi monitoring system is further operative to selectively monitor Wi-Fi operating bands and channels for presence of a Wi-Fi-capable device.

3. The system of claim 1, wherein the electronic device is a smartphone.

4. The system of claim 1, wherein the electronic device is a tablet computer.

5. The system of claim 1, wherein the Wi-Fi monitoring system is further operative to selectively establish communication with the Wi-Fi-capable device via Wi-Fi protocol and without using the information provided by the BLE Advertisement packets.

6. The system of claim 1, further comprising the Wi-Fi-capable device.

7. The system of claim 6, wherein the Wi-Fi-capable device has a Wi-Fi transceiver and a BLE transceiver.

8. The system of claim 7, further comprising a device housing, the BLE transceiver and the Wi-Fi transceiver of the Wi-Fi-capable device being carried by the housing.

9. The system of claim 1, wherein:
   the electronic device has a BLE transceiver and a Wi-Fi transceiver; and
   the Wi-Fi monitoring system is further operative to facilitate monitoring of signals associated with a Wi-Fi-capable device such that monitoring for the signals is alternately performed by the BLE transceiver and the Wi-Fi transceiver.

10. The system of claim 8, wherein the electronic device has a BLE transceiver, a Wi-Fi transceiver and embedded memory for exchanging information among the BLE transceiver, the Wi-Fi transceiver and the Wi-Fi monitoring system.

11. A method for facilitating wireless communication comprising:
   monitoring Bluetooth Low Energy (BLE) advertising channels with an electronic device;
   receiving, at the electronic device, Wi-Fi information corresponding to a Wi-Fi-capable device via BLE Advertisement packets associated with at least one of the BLE advertising channels, wherein the received Wi-Fi information corresponding to the Wi-Fi-capable device comprises operating band and channel of the Wi-Fi-capable device; and
   establishing Wi-Fi communication between the electronic device and the Wi-Fi-capable device via appropriate Wi-Fi protocol using the received Wi-Fi information provided by the BLE Advertisement packets.

12. The method of claim 11, further comprising suspending BLE advertisement transmission upon establishment of a Wi-Fi connection between the electronic device and the Wi-Fi-capable device.

13. The method of claim 11, wherein receiving information corresponding to a Wi-Fi-capable device comprises receiving information corresponding to operating band and channel of the Wi-Fi-capable device.

14. The method of claim 13, further comprising monitoring the operating band and channel of the Wi-Fi-capable device responsive to receiving the information corresponding to the Wi-Fi-capable device.

15. The method of claim 13, further comprising monitoring only the operating band and channel of the Wi-Fi-capable device identified by the BLE advertising channel responsive to receiving the information corresponding to the Wi-Fi-capable device.

16. The method of claim 11, further comprising selectively monitoring Wi-Fi operating bands and channels for presence of a Wi-Fi-capable device.

17. The method of claim 16, wherein selectively monitoring Wi-Fi comprises:
   monitoring BLE advertising channels for information corresponding to a Wi-Fi-capable device unsuccessfully for a predetermined time period; and
   monitoring for Wi-Fi operating bands and channels associated with a Wi-Fi-capable device responsive to the predetermined time period having elapsed.

18. The method of claim 16, wherein selectively monitoring Wi-Fi comprises alternately monitoring for BLE and Wi-Fi signals.

* * * * *